May 6, 1952  W. C. HASSELHORN  2,595,658
SEALED ARRESTER
Filed Dec. 23, 1948  2 SHEETS—SHEET 1
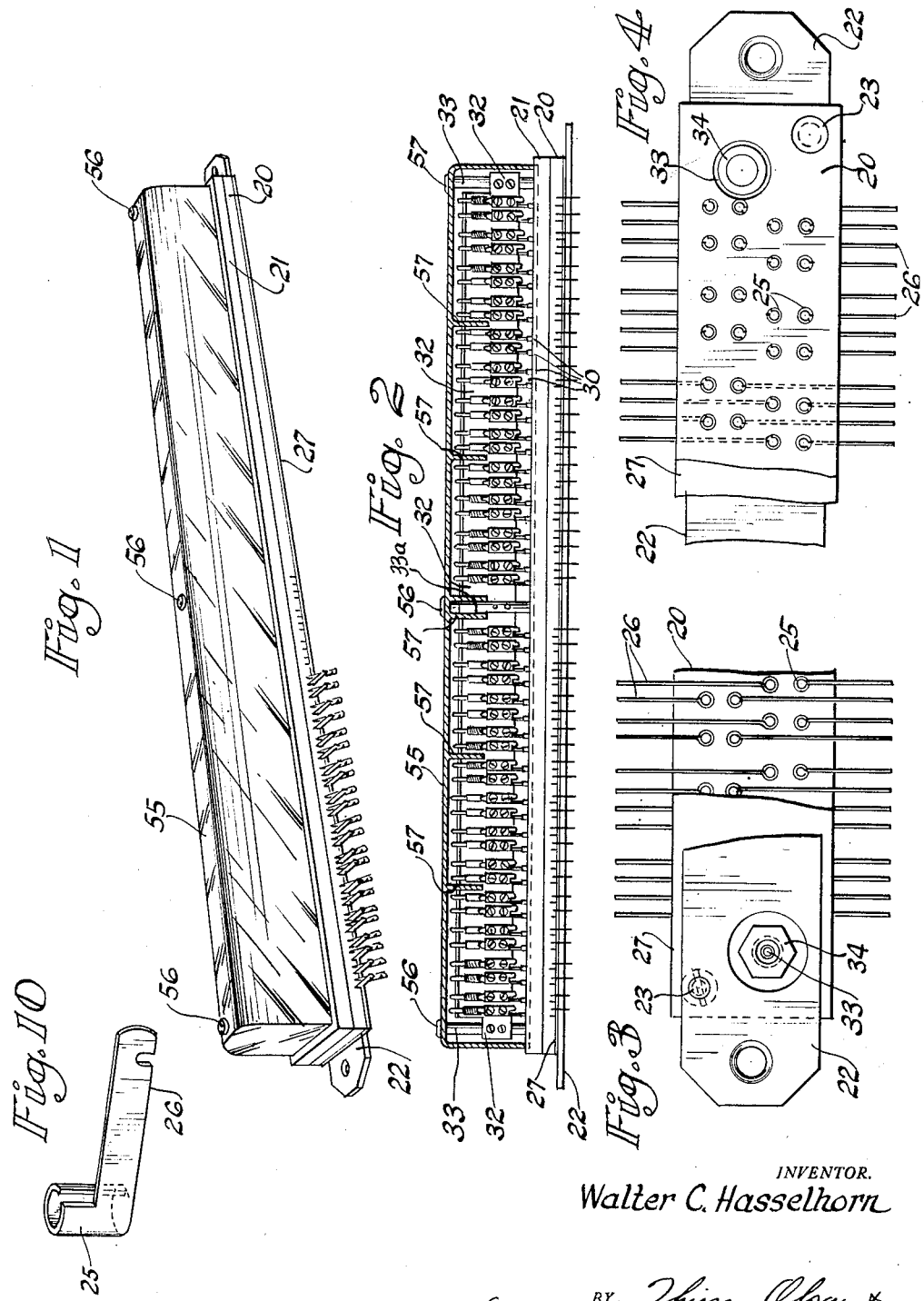
INVENTOR.
Walter C. Hasselhorn
BY Thiess, Olson &
Mecklenburger, ATTORNEYS.

May 6, 1952     W. C. HASSELHORN     2,595,658
SEALED ARRESTER
Filed Dec. 23, 1948     2 SHEETS—SHEET 2
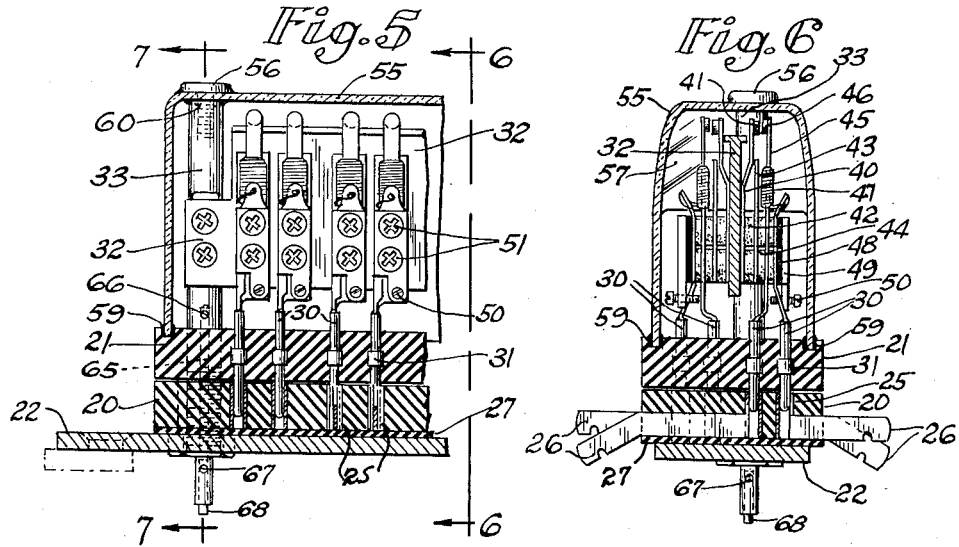
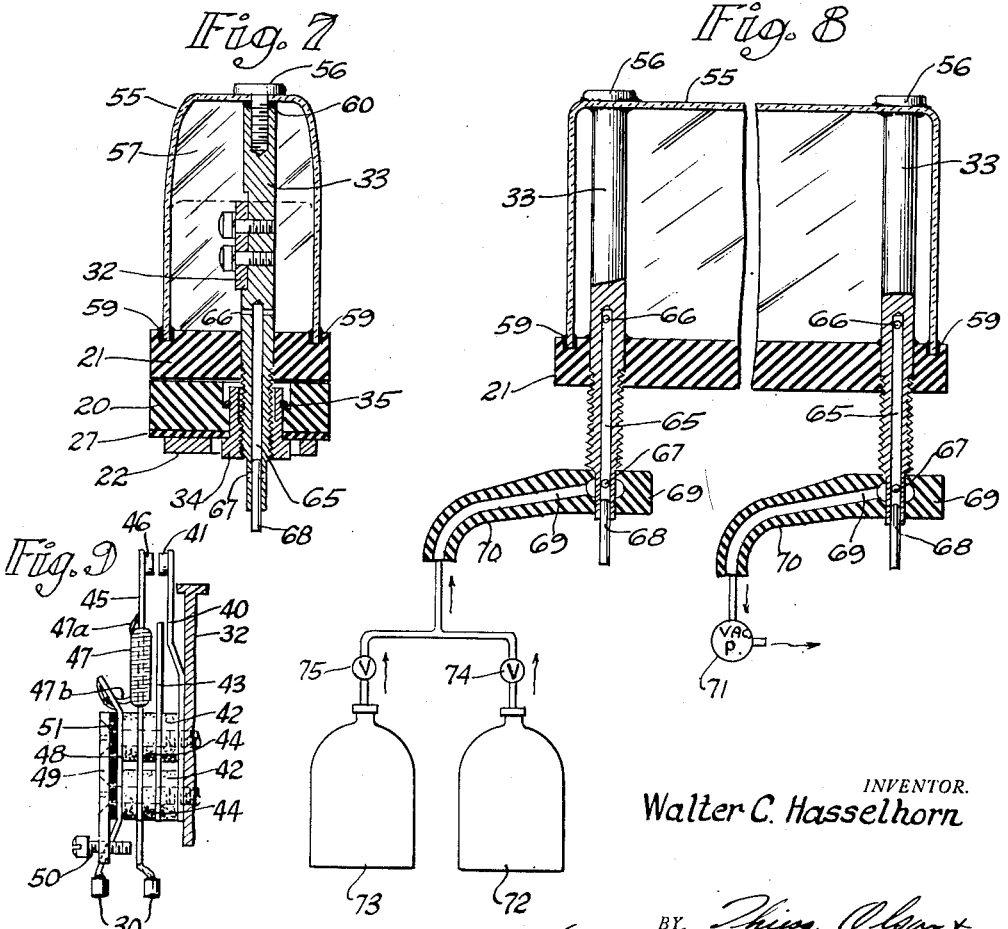
INVENTOR.
Walter C. Hasselhorn
BY *Thiess, Olson &*
*Mecklenburger*, ATTORNEYS Patented May 6, 1952

2,595,658

UNITED STATES PATENT OFFICE 2,595,658

SEALED ARRESTER

Walter C. Hasselhorn, Chicago, Ill., assignor to Cook Electric Company, Chicago, Ill., a corporation of Illinois Application December 23, 1948, Serial No. 67,013

12 Claims. (Cl. 175—30)

This invention relates to arrester bars or sections and lightning and heat coil arresters for telephone lines and the like.

In the usual installation, the arrester bars or sections having the arrester sets mounted thereon are secured to a suitable framework and its terminals connected more or less permanently, as by soldering, to the wires of the system. The lightning arresters are usually of the carbon block type, which may require replacement after each operation. The heat coils operate on sneak currents and must be manually reset after each operation to restore the line to normal condition.

In the larger installations, a force of service or maintenance men is constantly employed to keep the lines in commission. In the smaller stations there is apt to be less efficiency in this respect, and in isolated installations a service man may call only at intervals.

Objects of this invention, severally, are to provide an arrester bar or section of long life and requiring a minimum of attention; to provide an arrester bar with a sealed cover to exclude dirt and moisture and which may be filled with an inert gas to eliminate arcing and may be of transparent material to facilitate inspection; to provide an arrester bar having a two-part base or matching twin bases, one part carrying the line terminals and adapted to be permanently installed and wired in the system and the other part carrying on its outer face the arrester sets, the sealed cover, etc., and being readily attachable and removable from the other part as a unit, the proper connections being made when the two are brought together, whereby in case of repairs to the arresters the entire unit may be removed and another inserted in its place, so that service on the lines may not be appreciably interrupted and the proper repairs can then be made in the shop; to provide a heat coil for an arrester set which when combined with the separable bar tends to render the sealing of the cover practicable, since it is not necessary manually to reset the heat coils after each operation; to provide a self-grounding and self-restoring lightning arrester, and to provide such an arrester in combination with a fixed-gap arrester, which cooperate to save each other and prolong the life of both, thus eliminating carbon electrode arresters of the usual type and the necessity of frequent changes, and prolonging the life of the sealed arrester bar.

Further objects and advantages will appear from the description and claims to follow, in connection with the accompanying drawings which illustrate an embodiment of the invention, by way of example but not of limitation, and in which—

Figure 1 is a perspective view of a protector section or unit embodying the sealed feature and arrester sets of this invention and having provision for accommodating a plurality of telephone or other lines to be protected, preferably twenty-four, though the number to each unit may be varied as desired;

Fig. 2 is a longitudinal side view of the unit with the cover or sealing casing shown in section;

Fig. 3 is an enlarged bottom view of one end of the assembly base of the arrester unit with parts broken away to show the arrangement of the prong or terminal sockets therein and the connecting terminal strips therefor;

Fig. 4 is a similar view of the top side of an end portion of the said assembly base;

Fig. 5 is an enlarged longitudinal section through an end portion of the sealed arrester;

Fig. 6 is a cross-sectional view taken on the line 6—6 of Fig. 5;

Fig. 7 is a similar cross section on the line 7—7 of Fig. 5 to show the construction at one of the end posts;

Fig. 8 is a longitudinal section showing the method of exhausting the air from the arrester and filling it with a suitable inert gas;

Fig. 9 is a view on larger scale of the protector contacts or arrester set involved in a line conductor or wire; and Fig. 10 is a perspective view of one of the terminal strips and prong-receiving sockets of the arrester base, made as a unit.

Referring to these drawings, the complete arrester unit comprises a suitable base portion which is adapted to be secured to the framework of an arrester rack or other support at the plant or place where the arrester is to be installed for protection purposes. This base portion is provided with switch prong socket terminals opening on its outer face and with suitable terminal strips connected therewith and projecting at the two side edges of the base portion. The wires of the circuits to be protected may be permanently connected to the ends of these terminal strips, as by the usual hitch and soldering method, when the base portion has been permanently located on its support.

The arresters proper are mounted on the outside face of a similar and matching insulating base portion within a sealed chamber afforded by a suitable, preferably transparent, plastic, inverted, trough-like cover over the arresters and secured to the base, the cover being sealed at its edges to the top of the base. Suitable prong terminals are molded in this chamber base portion and are connected with the arrester sets and parts inside the sealed chamber. They project as terminal connecting prongs on the outer or under face of this base portion and are arranged to enter the sockets embedded in the permanent base portion when the arrester part is applied to the fixed part of the base. The two base portions when together may be regarded as a unit base for the arrester section or bar.

Thus, the entire group of arresters of the arrester bar is enclosed in a sealed chamber which, as will be explained, is preferably filled with a suitable inert gas, and may be readily attached to and detached from the fixed base portion without disturbing the wiring of the latter to the lines to be protected or the installation by plugging it into place thereon and tightening a couple of nuts at the back of the fixed base. Many advantages flow from this construction and arrangement, as will be manifest.

More specifically and as shown in Figs. 1 and 2, the complete arrester bar includes complemental insulating base portions designated herein relatively only as upper and lower base members 20 and 21, respectively, adapted to fit face to face and constituting a complete insulating mounting for the arrester bar or section. Upper base member 21 carries on its outer or top face one or more arresters or arrester sets adapted to be sealed within a cover or housing. Upper base member 21 is bodily removable from lower base member 20 by loosening a nut in the back at each end, or at predetermined distances and then by separating the parts, as will be explained. The parts are attached to each other by the reverse operation, that is, by coupling the two together and tightening the nuts referred to.

Base member 20 constitutes the fixed portion of the arrester bar when the bar is installed for use and the wires or conductors to be protected are suitably attached thereto in a more or less permanent way, usually by the well-known hitch and soldering method. At any rate, once the base is installed on the usual rack support, such as indicated in dotted lines at the left in Fig. 5, and wired, the installation does not have to be disturbed in order to remove or apply the protective arresters.

This lower base member 20 is preferably provided with a suitable metal supporting and strengthening strip or bar 22, which may be secured to its outer or lower face by screws 23, or otherwise, Figs. 3 and 4, and projects beyond the base at the ends to form readily accessible means for securing the base and the arrester bar as a whole to its support, said ends being suitably apertured for securing screws or the like.

Provision is made in this base member 20 for socket terminals to receive the terminal plugs or prongs of the sealed arrester section and for connecting the wires to be protected to such sockets. To this end, the insulating strip 20 has apertures formed therethrough to receive the metal tubular sockets 25 and further has slits from these apertures to the outside edges of the base in the lower or outer face thereof to receive flat metal terminal strips 26 leading from the sockets or sleeves 25 to the outside edges of said base, where they are to be connected to the outside wiring.

These metal terminals and sockets are conveniently made from one strip of metal, as shown in Fig. 10, the wider end being bent around to form the tubular prong-receiving socket 25 and the narrower part forming the terminal strip 26 extending to and beyond the edge of the base. The end of the circularly bent portion 25 is preferably left free and not touching the other part so as to leave a narrow slit in the socket tube 25 to provide a spring socket to receive and grip the plug terminal of the sealed chamber. The socket 25 thus formed is also slightly less in outside diameter than the hole or perforation in the insulating base to permit some lateral movement of the socket in case the rounded prong end is slightly off center with respect to the socket. The socket terminals are all alike except for the length of the flat terminal portion 26. There are two lengths to reach the sockets of a pair from the opposite edges of the base, as seen in Figs. 3, 4 and 6.

These terminal sockets are prevented from edgewise displacement by a flat strip of insulation 27 cemented or otherwise secured to the face of base 20.

As thus constructed, the base portion of the arrester bar may be secured to its support and the circuit wires connected to the terminals, and to this extent the installation may be considered permanent. For the removal of the arresters, as will appear, it is not necessary to interfere with this installation if the usual rack support for the arrester bars is provided.

The base portion 21 of the sealed chamber part of the arrester bar or section is provided with plug, pin or prong terminals 30 (Figs. 5 and 6) corresponding in location to the sockets 25 of the base portion 20, and are molded therein and in sealed relation thereto. They have an enlarged anchoring portion 31 so that they cannot be pulled out of the base or pushed in. Their outer ends project beyond the base 21 to form prong terminals to enter into the sockets 25 in the fixed base 20 and to make good electrical connection therewith.

On the upper or inside side of this removable base 21, an arrester-supporting metal plate 32 extends from end to end thereof in a plane perpendicular to the base and centrally thereof, and is supportingly secured at its ends, as by suitable screws, to posts 33, one at either end. A central post 33a, Fig. 2, is also provided, preferably on the other side of plate 32 from the end posts, to which said plate is also secured. These posts are also molded in the base 21 in sealed relation therewith.

The end posts 33 each extend through the base plate 20 (Fig. 7), are threaded and are engaged by the shouldered nut 34, the cylindrical extension of which is held in the plate 20 by a snap or C-ring 35, Fig. 7, partially seated in an annular groove in the extension, so that the nut cannot be lost and so that the turning of the nut in the loosening direction will force the plate 21 and the arresters carried thereby away from the plate 20 and thus readily disengage the connecting prongs 30 from their sockets 25. The turning of the nuts 34 in the tightening direction does just the reverse. The nuts 34 by their overhanging hexagonal portions draw and clamp the base plates 20 and 21 together and hold the sealed chamber section firmly to the base section.

The arrester sets or groups of springs, contacts and insulating blocks are mounted in individual stacked relation on the opposite sides of mounting plate 32, a stack or group for each wire served by the arrester bar. Thus, referring to Figs. 6 and 9 and the group on the right of plate 32 in Fig. 6 and on the left of said plate in Fig. 9, there is carried next to the mounting plate 32 a metal strip 40 bearing a contact 41 at its outer free end, next an insulating block or blocks 42, preferably of suitable ceramic material, a thin sheet or strip of heat insulation 43, and then another insulating block or blocks 44. The purpose of the sheet 43 as a heat insulator will be explained later. The next in the series is a long bimetallic strip 45 having a contact 46 at its free end and a heat coil of suitable wire 47 preferably wrapped about it. This heat coil is electrically connected in series in the line to be protected, preferably by connecting it at one end to the bimetallic spring 45 itself, as diagrammatically indicated at 47a, Fig. 9, and at the other end to the metal strip 48, as by wire 47b, which strip has on both sides suitable insulating strips or blocks as shown, and then on the outside of the stack is a metal plate 49 which carries in its lower end a threaded contact screw 50, which forms one of the terminals or electrodes of a spark gap as hereinafter described.

Suitable screws 51, Figs. 5 and 9, secure this stack in clamped relation to the plate 32, the screws being suitably insulated from the bimetallic strip 45 and the strip 48, but serving to electrically connect the outer clamping plate 49 with the plate 32, which is duly grounded.

There is an electrical connection from the lower end of the bimetallic strip 45 to the upper end of one of the terminal prongs 30 and from the strip 48 to the end of the other of the pair of prongs 30, which are in transverse alignment across the base 21. And since these prongs are connected by the sockets 25 and terminals 26 which are connected to the ends of the line wire, the circuit between said ends of said wire includes, as shown, a portion of the bimetallic strip, the heat coil 47 and the adjacent strip 48. Any current, therefore, in excess of the normal on the wire, and which if it persisted might damage the line or the instruments on the line, will, through the heat developed in coil 47 and in the bimetallic element, cause the bimetallic element 45 to become heated and due to its design cause it to flex or bend over to bring its contact 46 into engagement with contact 41 of spring contact 40 and thereby to ground the line through plate 32. This will protect the line and any instruments thereon from abnormal or sneak currents, and when it ceases, the bimetallic strip cools and straightens up again to open the circuit between contacts 41 and 46 and thus to restore things to normal operative condition.

In case of a heavy current on the line, as from contact of a line wire with a power circuit or from lightning, protection is afforded by both the normally fixed but adjustable spark gap at the screw 50, between the point of the screw and the lower fixed end of strip 45, and the spark gap between contacts 41 and 46, which may be closed by the flexing of strip 45 when heated and thereby to ground. The screw 50 is connected to ground through the plate 49, the screws 51 and plate 32, and the contact 41 is grounded through the spring strip 40 and the plate 32. These spark gaps are adjustable, as well known in the art, to take care of the discharges and arcing to which they may be subjected. They both may be adjusted the same, but preferably the gap between electrodes 41 and 46 is adjusted to be slightly more than that at screw 50.

The discharge from a high potential current on the line occurs at the screw gap 50. But, if too strong, or the arc at 50 persists, a further discharge occurs at gaps 41—46. This latter results in heating the strip 45 and flexing it to ground the line on contact 41. Any current flowing through the heat coil 47 at the same time adds to the heating and flexing of the bimetallic strip 45. The discharge at the second gap 41—46 tends to reduce that at gap 50 and thus to protect the same against excessive pitting, prolonging the life of the contacts, and the grounding of the line stops the arcing at both gaps. If the electrode 50 at the first gap becomes pitted in time and unable to perform as intended, or through some mishap it is not adjusted properly, the gap at 41—46 will function to protect the line. When the trouble is over, the bimetallic strip returns to normal position and the contacts 41 and 46 resume their spark gap relation to the line.

By this arrangement also, the use of carbon block electrodes is avoided. They are bulky and take up more room longitudinally of the bar than the set of springs. The arrester sets, stacks or groups cannot be so narrow and streamlined and so closely located on the bars as in this invention, and the bars or sections therefore must be longer to accommodate the same number of lines. Such electrodes may have to be replaced after each operation. By the dual spark gaps of this invention, their cooperation in automatically overcoming the hazards, their inclusion of the bimetallic self-restoring lightning and heat coil arrester, a long-life trouble-free arrester set is provided, and forms an important part of the permanently sealed arrester bar or section, more fully to be described.

The heat insulating sheet 43 is for the purpose of protecting the adjacent spring 40 from the heat of the coil 47.

The arrangement of these arresters and terminals, as seen in Figs. 3 and 4, may be in groups of four, two pairs in each group and each pair for a two-conductor line. One terminal 26 of each pair is bent slightly out of line with the other, as shown in Fig. 6, for ease in wiring and identification purposes. The arresters for a pair are mounted on opposite sides of the plate 32. The terminal prongs 30 through the base 21 and the holes for the terminal sockets 25 in base 20 are thus more uniformly and widely spaced than if the arresters for a line were side by side on one side of the said plate.

A cover 55 for the complete set of arresters on the bar or section is provided. It is preferably of some suitable clear plastic and transparent, such as styrene or methyl methacrylate, and molded in the desired form. It is supported by and secured to the outer ends of the end posts 33 and the central post 33a by suitable socket headed screws 56 threading into the ends of the posts. To further support, stiffen and hold the cover in place, depending cross webs 57, Figs. 2, 6 and 7, may be formed integrally and at intervals with the upper part of the cover, the same being slotted upwardly from their lower edges to fit down over the longitudinal plate 32. At the center post 33a there may be a web 57 on either side of the post.

The peripheral edge of cover 55 fits into a corresponding groove 59 in the face of the insulating base 21 adjacent and around the peripheral edge of said base.

Thus, the cover 55 encloses the arresters on the section of bar, is rigidly attached thereto and forms a part of the unitary removable and attachable arrester bar section.

This cover is also preferably sealed to the base 21 to form therewith a permanently sealed chamber for the arresters mounted on the section. To this end, the groove 59 is filled with or contains a suitable sealing cement into which the edge of the cover is forced when it is applied to the base so as to form therewith an air or gas tight joint and connection. Similarly, the upper ends of the posts 33 and 33a are reamed or dished out, as indicated at 60, Fig. 7, to provide a recess in each, which is filled with a sealing cement, so that when the cover is applied and the screws 56 are driven home the joints are effectively cemented and sealed against the passage of air or gas.

One object of the sealed, rugged construction described is that the air may be exhausted from the arrester chamber and the same preferably filled with a suitable inert gas. A novel and convenient way of doing this without the necessity of added more or less complicated connections to the chamber is shown in Figs. 5, 7 and 8, where the lower ends of posts 33 are shown provided with axial bores 65 extending up into the sealed chamber, which are there connected by a cross bore 66 with the inside of the chamber. The lower or outer ends of the posts are smoothed off—that is, the external threads removed for a short distance to form a sort of nipple, and a cross opening 67 is drilled therein. A suitable plug 68 is driven into the end of this nipple, stopping short of said cross bore or port 67 during the process of exhausting the air and filling the chamber with an inert gas.

In order to connect with the passages 67 and 65 in the post, a suitable coupling or connector 69 of rubber or the like on the end of a flexible tube 70 is forcibly slipped over the nipple until its inner passage freely connects with the port 67 of the nipple. The tube 70 thus attached to one end post 33 is suitably connected with a vacuum pump 71, diagrammatically indicated, and the other post 33 is similarly connected with sources 72 and 73, respectively, of a flushing gas and an inert filling gas, also diagrammatically indicated. Accordingly, with the stop valves 74 and 75 of the flushing and inert gas sources closed and the vacuum pump 71 operated, the air from the sealed chamber containing the arresters is exhausted as far as practicable. Then the valve 74 to the flushing gas supply 72 is opened, the chamber filled with it and the remaining air forced out. This valve 74 to the flushing tank or container is then closed and this gas is exhausted to the extent possible by the vacuum pump. The valve 75 to the inert gas 76 is then opened and the chamber completely filled with it at the pressure of the source. The plugs 68 in the ends of the nipples are then driven into the passages 65 of the nipples or posts until the cross passages 67 are covered and stopped thereby, the connectors or couplings 69 removed, and the sealed chamber remains filled with inert gas instead of air. This inert gas tends to eliminate arcing and prolongs the life of the contacts.

While the bar shown is designed to accommodate 24 lines of two-conductor circuits, it may be made for one or more lines within reasonable limits.

In operation, the assembly having been made as described and the bar installed and its terminals 26 suitably connected to the telephone or other lines to be protected, each conductor of the lines includes an arrester set, such as that indicated in large scale in Fig. 9, through the medium of the line terminals 26 and the sockets 25 in the permanently installed base part of the bar or section, and thence through the prongs or pins 30 molded in the base of the removable arrester-carrying portion of the bar, which pins removably engage in the said sockets 25. The circuit is completed from the pins 30 through the contact strip 48, the wire connection 47b, the heat coil 47, connection 47a and the bimetallic strip 45 to the other pin 3 of the pair of pins involved in the circuit. Normal communication is carried on over the line circuits thus established.

The operation of the heat coil 47, the bimetallic strip 45 and the spark gaps at screw 50 and contacts 41—46 in grounding and protecting the line from sneak currents and from high potential currents from lightning or otherwise on the line has been explained in detail and need not be repeated here save to mention that the self-restoring feature due to the bimetallic element renders it unnecessary for an attendant to be present and to reset the heat coil every time it operates or to replace carbon blocks in the lightning arrester when a high potential discharge takes place. The bars are thus of long life, and an inspection and repair crew in the usual sense is not required.

If repairs become necessary, the arrester portion of the bar is readily removed as a unit and another put in its place without appreciable interruption of the service on the lines. This is done without disturbing the wiring or installation of the base portion, by loosening the nuts 34 and withdrawing the pins or prongs 30 from the sockets 25. The new bar is attached as expeditiously. The bar to be repaired may then be sent to the shop or factory, where it can be attended to by skilled mechanics with shop facilities, and does not have to be repaired on the rack at the installation by more or less unskilled mechanics and under inconvenient circumstances.

Such bars are especially advantageous in the more isolated installations, since they are of long life and do not require continuous servicing. If the service man calls and wishes to renew the arresters, it takes but a few minutes to slip the old one out and a new one in. The old may then be repaired, if necessary, at the factory or shop. By this arrangement, the time the lines are out of commission is greatly shortened, the repair work can be more expeditiously and better done in the shop or factory, and the cost of maintenance and servicing is greatly reduced.

Without further elaboration, the foregoing will so fully explain the gist of the invention that others may, by applying current knowledge, readily adapt the same for use under varying conditions of service, without eliminating certain features which may properly be said to constitute the essential items of novelty involved, which items are intended to be defined and secured by the following claims.

I claim:

1. An arrester section or bar comprising a two part base, one part being adapted to be permanently mounted on a support, a plurality of line terminals thereon for connection with lines to be protected, arrester terminal receiving connectors thereon connected with the line terminals, a plurality of self-restoring arresters to prevent current and voltage overloads mounted on the other part of the base, an insulating cover to seal against said other part of the base to enclose said arresters, arrester terminals thereon adapted to connect with said arrester receiving terminals on said other part when the two parts are brought together, whereby a plurality of the arresters may be attached to and detached from said permanent base portion as a unit without disturbance of the latter's installation.

2. An arrester bar or section for the protection of a plurality of lines comprising a two-part base, a plurality of self-restoring arresters secured to one part of said base, a plurality of electric terminals secured in the other part of said base, quickly detachable means for connecting the arresters mounted in said one part of the base to said terminals in the other part of said base for the lines to be protected, a sealed cover over said arresters engaging said one part of the base, and an electrically inert gas filling said cover.

3. An arrester bar for a plurality of telephone lines or the like comprising an elongated insulating base, posts extending transversely therethrough in sealed relation, a mounting strip carried by the posts on one side of said base, arrester groups one for each line wire mounted on said strip, connections therefrom through the base in sealed relation for the line wires on the exterior, a cover for said arrester groups on one side of the base, and means for sealing said cover in position to form a sealed chamber for said arresters, at least one of said posts having a passage therethrough in the portion passing through said base and communicating with the interior of said chamber and with the exterior whereby the air in the said chamber may be exhausted through said post and the chamber filled with an inert gas.

4. A two part arrester bar for a plurality of telephone lines or the like comprising a base part and a cover part, the base part consisting of an insulating strip adapted to be secured to a support, prong receiving connections and line terminals connected therewith embedded in said strip, the line terminals projecting at the longitudinal edges of the strip and adapted to be connected with the line wires to be protected, the cover part of the section including an insulating strip corresponding to that of the base part and adapted to fit thereon face to face and a sealed housing engaging said insulating strip, arresters mounted on the outer face of said cover strip, connecting prongs embedded in and extending through said cover strip and connected with said arresters on the one side of the cover strip and adapted to enter and make contact with said prong receiving connection on the base part, whereby the application of the cover part to the base part connects the arresters as a unit to the respective line circuits connected with the base section.

5. An arrester for telephone lines or the like comprising a unit structure having a multi-part base with complemental terminal connections on each adapted by a sliding fit to complete a circuit relation therebetween, one of said base parts having a sealed housing thereon, posts extending upwardly into said housing from said last base part, at least one of said posts having a closable air or gas passage to the interior of said housing, a cross bar between said posts, said cross bar being grounded through said posts, and protective units in said housing mounted on said cross bar, said protective units being connected in circuit with said terminal connections and having a grounding member in contact with said cross bar.

6. An arrester for telephone lines or the like comprising a unit structure having a multi-part base with complemental terminal connections on each adapted by a sliding fit to complete a circuit relation therebetween, one of said base parts having a sealed housing thereon, posts extending upwardly into said housing from said last base part, a cross bar between said posts, said cross bar being grounded through said posts, and protective units in said housing mounted on said cross bar, said protective units being connected in circuit with said terminal connections and having a grounding member in contact with said cross bar, said posts holding said housing in sealed relation upon said base part carrying the same and at least one of which is provided with a closable air or gas passage to the interior of said housing.

7. An elongated arrester bar for telephone lines or the like comprising a unit structure having a two-part base with a plurality of complemental terminal connections on each adapted by a sliding fit to complete circuit connections therebetween, supporting posts on the upper part of said base extending upwardly therefrom, an elongated mounting plate secured to said posts edgewise to the face of said upper part and grounded therethrough, and a plurality of excess-current protective units for said lines mounted on said plate and connected in circuit with said terminal connections and having grounding connections to said plate.

8. An elongated arrester bar for telephone lines or the like comprising a unit structure having a two-part base with a plurality of complemental terminal connections on each adapted by a sliding fit to complete circuit connections therebetween, supporting posts on the upper part of said base extending upwardly therefrom, an elongated mounting plate secured to said posts edgewise to the face of said upper part and grounded therethrough, a plurality of excess-current protective units for said lines mounted on said plate and connected in circuit with said terminal connections and having grounding connections to said plate, said posts having one of the their ends extending into the lower part of said base, and means in the said lower part adapted to engage said post to draw and hold the said base parts and said slidable contacts together.

9. An elongated arrester bar for telephone lines or the like comprising a unit structure having a two-part base with a plurality of complemental terminal connections on each adapted by a sliding fit to complete circuit connections therebetween, supporting posts on the upper part of said base extending upwardly therefrom, an elongated mounting plate secured to said posts edgewise to the face of said upper part and grounded therethrough, excess-current protective units for said lines mounted on said plate and connected in circuit with said terminal connections and having grounding connections to said plate, said posts having ends extending into the lower part of said base, and means adapted to engage said posts in said lower part and restrained as to axial movement in said part whereby to draw the said parts and sliding contacts together and to separate the same.

10. An elongated arrester bar for telephone lines or the like comprising a unit structure having a two-part base with complemental terminal connections on each adapted by a sliding fit to complete circuit connections therebetween, the upper part of said base parts having an inverted elongated sealed housing thereon, supporting posts extending upwardly into said housing from the said upper base part and adjacent the ends thereof, an elongated plate extending between and secured to said posts and grounded therethrough, and protective units in said housing mounted side by side on said plate, said protective units being connected in circuit with said terminal connections and having grounding connections to said plate, said housing being secured at its top to the upper ends of said posts and sealed to said upper base part, at least one of said posts extending through the lower part of said base and having a closable passage therethrough to said sealed housing.

11. An arrester for telephone lines or the like comprising a unit structure having a multi-part base with complemental terminal connections on each adapted by a sliding fit to complete a circuit relation therebetween, one of said base parts having a sealed housing thereon, an electrically inert gas filling said housing, posts extending upwardly into said housing from said last base part, at least one of said posts having a closable gas passage to the interior of said housing, a cross bar between said posts, said cross bar being grounded through said posts, and protective units in said housing mounted on said cross bar, said protective units being connected in circuit with said terminal connections and having a grounding member in contact with said cross bar.

12. An elongated arrester bar for telephone lines or the like comprising a unit structure having a two-part base with complemental terminal connections on each adapted by a sliding fit to complete circuit connections therebetween, the upper part of said base parts having an inverted elongated sealed housing thereon, an electrically inert gas filling said sealed housing, supporting posts extending upwardly into said housing from the said upper base part and adjacent the ends thereof, an elongated plate extending between and secured to said posts and grounded therethrough, and protective units in said housing mounted side by side on said plate, said protective units being connected in circuit with said terminal connections and having grounding connections to said plate, said housing being secured at its top to the upper ends of said posts and sealed to said upper base part, at least one of said posts extending through the lower part of said base and having a closable passage therethrough to said sealed housing.

WALTER C. HASSELHORN.

REFERENCES CITED

The following references are of record in the file of this patent:

UNITED STATES PATENTS

| Number | Name | Date |
|---|---|---|
| 1,173,096 | Chapman | Feb. 26, 1916 |
| 1,179,380 | Parker | Apr. 11, 1916 |
| 1,277,133 | Sands | Aug. 27, 1918 |
| 1,405,935 | Parker | Feb. 7, 1922 |
| 1,408,606 | King | Mar. 7, 1922 |
| 1,462,026 | Booth | July 17, 1923 |
| 1,962,062 | Evans | June 5, 1934 |
| 2,086,424 | Koehler | July 6, 1937 |
| 2,124,364 | Brach | July 19, 1938 |
| 2,168,769 | Fisher | Aug. 8, 1939 |
| 2,204,948 | Pond | June 18, 1940 |
| 2,309,232 | Baker | Jan. 26, 1943 |
| 2,360,835 | Kongsted | Oct. 24, 1944 |
| 2,439,326 | Wilson | Apr. 6, 1948 |
| 2,463,718 | Sands | Mar. 8, 1949 |

FOREIGN PATENTS

| Number | Country | Date |
|---|---|---|
| 81,001 | Sweden | July 24, 1934 |